(12) United States Patent
Hortenbach et al.

(10) Patent No.: US 8,955,377 B2
(45) Date of Patent: Feb. 17, 2015

(54) METHOD FOR DETERMINING OR MONITORING A PREDETERMINED FILL LEVEL, A PHASE BOUNDARY OR A DENSITY OF A MEDIUM

(75) Inventors: Martin Hortenbach, Linkenheim-Hochstetten (DE); Martin Urban, Lörrach (DE); Dietmar Frühauf, Lörrach (DE); Tobias Brengartner, Freiburg (DE); Frank Ruhnau, Straubenhardt (DE); Michael Siegel, Karlsruhe (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 410 days.

(21) Appl. No.: 13/375,804

(22) PCT Filed: Apr. 23, 2010

(86) PCT No.: PCT/EP2010/055445
§ 371 (c)(1),
(2), (4) Date: Dec. 22, 2011

(87) PCT Pub. No.: WO2010/139508
PCT Pub. Date: Dec. 9, 2010

(65) Prior Publication Data
US 2012/0085165 A1 Apr. 12, 2012

(30) Foreign Application Priority Data
Jun. 3, 2009 (DE) .................. 10 2009 026 685

(51) Int. Cl.
G01F 23/00 (2006.01)
G01F 23/296 (2006.01)
(52) U.S. Cl.
CPC ........ G01F 23/2961 (2013.01); G01F 23/2967 (2013.01)
USPC ...................................... 73/290 V

(58) Field of Classification Search
CPC ...... G01N 9/00; G01F 23/296; G01F 23/2961
USPC ............................................. 73/64.53, 290 V
See application file for complete search history.

(56) References Cited

U.S. PATENT DOCUMENTS 3,777,277 A * 12/1973 Naber ........................... 331/49
6,851,313 B2 2/2005 Fehrenbach
(Continued)

FOREIGN PATENT DOCUMENTS

| DE | 10 2005 015547 A1 | 10/2006 |
| EP | 0 123 189 A1 | 10/1984 |
| EP | 0 296 583 A2 | 12/1988 |
| EP | 1 333 256 A2 | 8/2003 |

OTHER PUBLICATIONS

English translation of IPR.
(Continued)

*Primary Examiner* — Hezron E Williams
*Assistant Examiner* — David Z Huang
(74) *Attorney, Agent, or Firm* — Bacon & Thomas, PLLC

(57) ABSTRACT

A method and an apparatus for determining or monitoring a predetermined fill level, a phase boundary or a density of a medium in a container with an oscillatable unit. The oscillatable unit is placed at the height of the predetermined fill level and is excited to oscillate successively with discrete exciter frequencies following one another in a frequency scanning operation (sweep) within a predeterminable frequency band in the working range of the oscillatable unit. The corresponding oscillations of the oscillatable unit are received in the form of received signals; wherein that exciter frequency is ascertained in the frequency scanning operation, at which the oscillatable unit oscillates with an oscillation frequency, which has a predetermined phase shift between the transmission signal and the received signal; and wherein the transmitting/receiving unit excites the oscillatable unit to oscillate with the ascertained oscillation frequency.

14 Claims, 7 Drawing Sheets

(56) References Cited

U.S. PATENT DOCUMENTS

2009/0205411 A1    8/2009   Muller  
2012/0119758 A1*   5/2012   Urban .......................... 324/617

OTHER PUBLICATIONS

International Search Report.  
German Search Report.

* cited by examiner

METHOD FOR DETERMINING OR MONITORING A PREDETERMINED FILL LEVEL, A PHASE BOUNDARY OR A DENSITY OF A MEDIUM

TECHNICAL FIELD

The invention relates to a method and to an apparatus for determining or monitoring a predetermined fill level, a phase boundary or a density of a medium in a container using an oscillatable unit, wherein the oscillatable unit is placed at the height of the predetermined fill level or at the height of the phase boundary. If it is assured that the oscillatable unit immerses in the medium, the method of the invention and the apparatus of the invention can also be used for measuring the density of the medium.

BACKGROUND DISCUSSION

Vibration detectors, or limit level switches, for detecting or monitoring fill level, phase boundary or density of a medium in a container are already known. They are available from Endress+Hauser in many embodiments under the names LIQUIPHANT and SOLIPHANT.

Vibration detectors usually have an oscillatory rod or an oscillatory fork as the oscillatory element; the oscillatory element is secured to a membrane or diaphragm. Moreover, so called membrane oscillators, in which the additional oscillatory element is omitted, are also known. The membrane is clamped in a sensor housing and is excited to oscillations by an electromechanical or a piezoelectric drive. A stack, or bimorph, drive is usually used as transmitting/receiving unit. The excitation of the oscillatable unit occurs at the resonance frequency—thus here a so called fundamental wave excitation—wherein the phase shift between the transmission signal and the received signal usually lies in a defined range. Usually, this range lies between 46° and 140°.

Vibration detectors embodied as fill level measuring devices utilize the effect that the oscillation frequency and the oscillation amplitude depend on the respective degree of covering of the oscillatory element: While the oscillatory element can execute its oscillations freely and undamped in air, as soon as it becomes immersed partially or completely in the medium, the oscillatory element experiences a frequency and amplitude change. On the basis of a predetermined frequency change, the reaching of the predetermined fill level or a predetermined phase boundary level of the medium in the container can thus be unequivocally deduced. Fill level measuring devices are, moreover, used principally as overfill protection or for the purpose of protection against a pump running empty.

Moreover, the oscillation of the oscillatory element is also influenced by the respective density of the medium, since the mass moved changes with density. Therefore, with a constant degree of covering, a functional relationship with the density of the medium exists, so that vibration detectors are well suited both for fill level determination as well as for density determination.

In practice, the oscillations of the membrane are recorded for the purpose of monitoring and detecting the fill level or the density of the medium in the container and are converted to electrical, received signals by means of at least one piezoelectric element. The electrical received signals are then evaluated by evaluating electronics. In the case of fill level determination, the evaluating electronics monitors the oscillation frequency and/or the oscillation amplitude of the oscillatory element and signals the state 'sensor covered' or 'sensor uncovered' as soon as the measured values drop under or exceed a predetermined reference value. A corresponding report to operating personnel can occur via an optical and/or an acoustic path. Alternatively or supplementally, a switching operation is triggered; so, for instance, an inlet valve or a drain valve on the container is opened or closed.

The devices for measuring fill level, phase boundary level or density mentioned above are applied in many branches of industry, for example, in the chemicals industry, in the foods industry or in water processing. The range of fill substances monitored extends from water to yogurt, paints and lacquers, to high viscosity media such as honey, and to strongly foaming media, such as beer.

Known vibration detectors are distinguished by a closed oscillatory circuit constructed of analog components. In order to be able to operate the different types of vibration detectors, the analog components must be matched to the respective embodiments of the vibration detectors as optimally as possible. Among other things, the particular geometry of the oscillatable unit plays a large role. Furthermore, a microcontroller is provided, which performs the evaluation of the ascertained frequency and controls communication with a central computer.

In addition to high development time and monetary costs, the individual solutions previously mentioned lack the desired high flexibility and a compact form of construction. Thus, known vibration sensors often only permit a statement about whether the oscillatable element is covered or not. Also, special electronic components often come into use for the control/evaluation unit, which is disadvantageous, since these components have relatively strict component tolerances. It is also disadvantageous that there is no protection against reverse engineering in the case of known detectors comprising electronic components: A competitor can replicate a vibration detector with knowledge of the components without possessing detailed knowledge of the functional principle of the detector.

SUMMARY OF THE INVENTION

An object of the invention is to provide a method and an apparatus, which permit the equipping of different types of vibration detectors with a largely identical control/evaluation unit.

Regarding the method, the object is achieved by features including that: the oscillatable unit is excited to oscillations with successive discrete exciter frequencies, following one another in time, by means of a frequency scanning operation within a predeterminable frequency band in the working range of the oscillatable unit; the corresponding oscillations of the oscillatable unit are received in the form of received signals; and that exciter frequency is ascertained in the frequency scanning operation, in which the oscillatable unit oscillates with an oscillation frequency, which has a predetermined phase shift between the transmission signal and the received signal. Either the transmitting/receiving unit excites the oscillatable unit to oscillations with the ascertained oscillation frequency (in fill level measurement or in phase boundary level monitoring), or the following frequency scanning operation is started, so that permanent frequency scans take place (in density measurement).

Especially, the oscillation frequency of the oscillatable unit with a predetermined phase shift is the oscillation frequency of the fundamental mode—fundamental wave excitation—at the predetermined phase shift, or it is the oscillation frequency of a higher mode—harmonic excitation—at the predetermined phase shift.

An advantageous embodiment of the method of the invention provides that, when the oscillatable unit is oscillating outside the oscillation frequency for the predetermined phase shift between transmission signal and received signal, frequency scanning is started anew, until the right oscillation frequency is found.

In contrast to known analog vibration detectors, the solution of the invention is implemented largely digitally. The oscillatable unit is operated with its oscillation frequency at the predetermined phase shift between the transmission and received signals, independently of the current damping. Each current oscillation frequency of the oscillatable unit, e.g. the current resonance frequency, is ascertained. For this, the working range of frequencies of the oscillatable unit is completely scanned. In order to determine the current resonance frequency of the oscillatable unit, it is necessary, moreover, to free the oscillations of the oscillatable unit of noise and disturbance signals.

Known vibration detectors have—as already mentioned—a closed oscillatory circuit comprising an oscillatable unit and a control/evaluation unit. Here, the resonance frequency in the working range of the oscillatable unit tunes automatically to a fixed phase shift between the transmission and received signals. In contrast, an oscillation of a determined frequency and a determined phase relationship coupled therewith are predetermined by the digital apparatus of the invention. A forced excitation of the oscillatable unit is effected. Then, the oscillatable unit sweeps through its entire working range of frequencies, i.e. the current resonance frequency of the oscillatable unit is ascertained, in time, by an excitation of successive discrete frequencies, which are closely spaced to one another. This method is also referred to as a frequency sweep.

Preferably, the oscillation frequency of the oscillatable unit at the predetermined phase shift between the transmission signal and the received signal is ascertained by evaluating the amplitudes of the received signals received by the transmitting/receiving unit. Alternatively, it is provided that the oscillation frequency of the oscillatable unit at the predetermined phase shift between the transmission signal and the received signal is ascertained by evaluating the phase shift between the transmission signal and the received signal. Thus, a phase shift of 180° arises in the receiver signal both in the case of resonance as well as in the case of no resonance.

An embodiment of the method of the invention provides that the solution is implemented completely on a digitized basis. In this case, the received signal is digitized by an analog/digital converter and further processed purely digitally. Alternatively, the opportunity exists to implement the solution of the invention by means of switchable circuit variants. For this, analog circuit technology can largely be retained; each required signal path is controlled by a microcontroller and so arranged by means of analog switches that each required circuit part can be brought into the signal path.

Preferably however, the control/evaluation unit of the solution of the invention is embodied as a digital circuit, especially as a digital signal processor DSP, as an FPGA, FPAA or as a PSoC—programmable system on chip. Configurable analog and digital resources are arranged in a PSoC together with a microcontroller in one integrated circuit. Since only few external components are necessary, the PSoC option saves much space and, moreover, is cost effective.

In an advantageous embodiment of the method of the invention, it is provided that the evaluation of the phase shift between the transmission signal and the received signal is done by a phase selective rectification, which produces a direct voltage proportional to the phase and amplitude. In such case, the received signals of the phase selective rectifier are formed by the received signal of the transmitting/receiving unit and a signal derived from the transmitting unit. The derived signal is preferably a periodic square or sinusoidal signal.

Moreover, it is provided that the frequency range in the working range of the oscillatable unit is swept during a frequency scanning.

In a first form of embodiment of the method of the invention, it is provided that the oscillation frequency of the oscillatable unit at the predetermined phase shift between the transmission signal and the received signal is ascertained based on two frequencies, which lie essentially symmetrically to the oscillation frequency of the oscillatable unit at the predetermined phase shift between the transmission signal and the received signal and in the case of which predetermined threshold values of the amplitude of the received signals or the phase proportional direct voltage are reached or exceeded.

An alternative embodiment of the method of the invention provides that the phase selective signal produced by a phase selective rectifier is divided into a positive signal portion and a negative signal portion, that the envelope curve of the positive signal fraction and the envelope curve of the negative signal fraction are formed, that the two envelope curves are added, and that the current resonance frequency of the oscillatable unit at the predetermined phase shift between the transmission signal and the received signal is ascertained based on the addition signal. The method is performed here with an envelope curve detector. The addition signal always has the maximum amplitude at a frequency, at which the phase shift between the transmission signal and the received signal corresponds to the predetermined, desired phase shift.

The implementing of the envelope curve detector can be via a diode and an RC-unit connected thereafter. Depending on the direction in which the diode is operated, these can exclusively allow either the positive or the negative part of the applied signal through. The connected RC-unit ascertains the envelope curve from the resulting output signal.

Two envelope curve detectors are required in order to ascertain the negative and the positive parts of the phase selective signal. In order to avoid the diodes cutting off a part of the phase selective signal, in given cases, a direct voltage is added to the phase selective signal.

Regarding the apparatus, the object is achieved by features including that: a transmitting/receiving unit is provided; the transmitting/receiving unit excites the oscillatable unit to oscillations with successive discrete exciter frequencies following one another in a frequency scanning operation within a predeterminable frequency band in the working range of the oscillatable unit and receives the corresponding oscillations of the oscillatable unit; a control/evaluation unit is provided, which ascertains the exciter frequency at which the oscillatable unit oscillates at an oscillation frequency with a predetermined phase shift between the transmission signal and the received signal; and the transmitting/receiving unit excites the oscillatable unit to oscillations with the ascertained oscillation frequency at the predetermined phase shift between transmission signal and received signal.

Furthermore, the control/evaluation unit is so embodied that it ascertains the oscillation frequency of the oscillatable unit at the predetermined phase shift between the transmission signal and the received signal via evaluation of the phase between the transmission signal and the received signal or the amplitude of the received signal during the frequency scanning operation.

Advantages of the solution of the invention are summarized as follows:

The control/evaluation unit comprises identical components for all embodiments of oscillatable units and for all areas of application of the vibration detectors. The solution of the invention is, thus, platform capable.

A high flexibility as regards the functionality of the vibration detector is achieved through the digitizing of the control/evaluation unit; a free scalability is available, the phase shift can be freely selected, and a digital interface is present.

Copy protection is present, since the control/evaluation unit can only be reverse engineered with considerable effort.

The control/evaluation unit, which, as a rule, is arranged on a circuit board, is compact.

Expensive special components with relatively high component tolerances can be omitted.

In an advantageous embodiment of the apparatus of the invention, a control/evaluation unit with a phase selective rectifier is provided, wherein the rectifier produces a phase selective direct voltage. A low-pass filter and a comparator are connected to the phase selective rectifier. Furthermore, a microcontroller is provided, which ascertains the oscillation frequency of the oscillatable unit at the predetermined phase shift between transmission signal and received signal based on two frequencies, which lie symmetrically to the resonance frequency and at which predetermined threshold values of the amplitude of the received signals or the phase proportional direct voltage of the rectifier are reached or exceeded.

Moreover, it is provided, that the phase selective detector comprises a multiplier, a producer unit for a reference signal, whose clock frequency is adjustable via the microcontroller, a phase shifter controllable by the microcontroller and a low-pass, wherein the multiplier multiplies a reference signal (which has, in each case, the clock frequency predetermined by the microcontroller) with the received signal; wherein the phase shifter adjusts the phase relationship of the reference signal and the received signal; and wherein the phase proportional direct voltage is tappable at the output of the first low-pass, which is connected after the multiplier.

Furthermore, it is seen as advantageous when a comparator, which serves as a threshold detector and whose output signals are forwarded to the microprocessor, is connected after the low-pass, wherein the microcontroller ascertains the current oscillation frequency of the oscillatable unit at the predetermined phase shift between the transmission signal and the received signal based on an average of a first threshold value and a second threshold value ascertained during the frequency scanning operation.

An advantageous further development of the solution described above provides that a second low-pass is connected after the phase shifter; a sinusoidal signal is present at the output of the second low-pass; the transmitting/receiving unit excites the oscillatable unit to oscillations at the current oscillation frequency of the oscillatable unit at the predetermined phase shift between transmission signal and received signal using the sinusoidal signal.

An alternative embodiment of the apparatus of the invention provides a control/evaluation unit, which produces a phase selective rectified signal. Then, the phase selective signal is divided into a positive signal portion and a negative signal portion; subsequently, the envelope curve of the positive signal fraction and the envelope curve of the negative signal fraction are determined and added. On the basis of the addition signal, the control/evaluation unit ascertains the oscillation frequency of the oscillatable unit at the predetermined phase shift between the transmission signal and the received signal.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
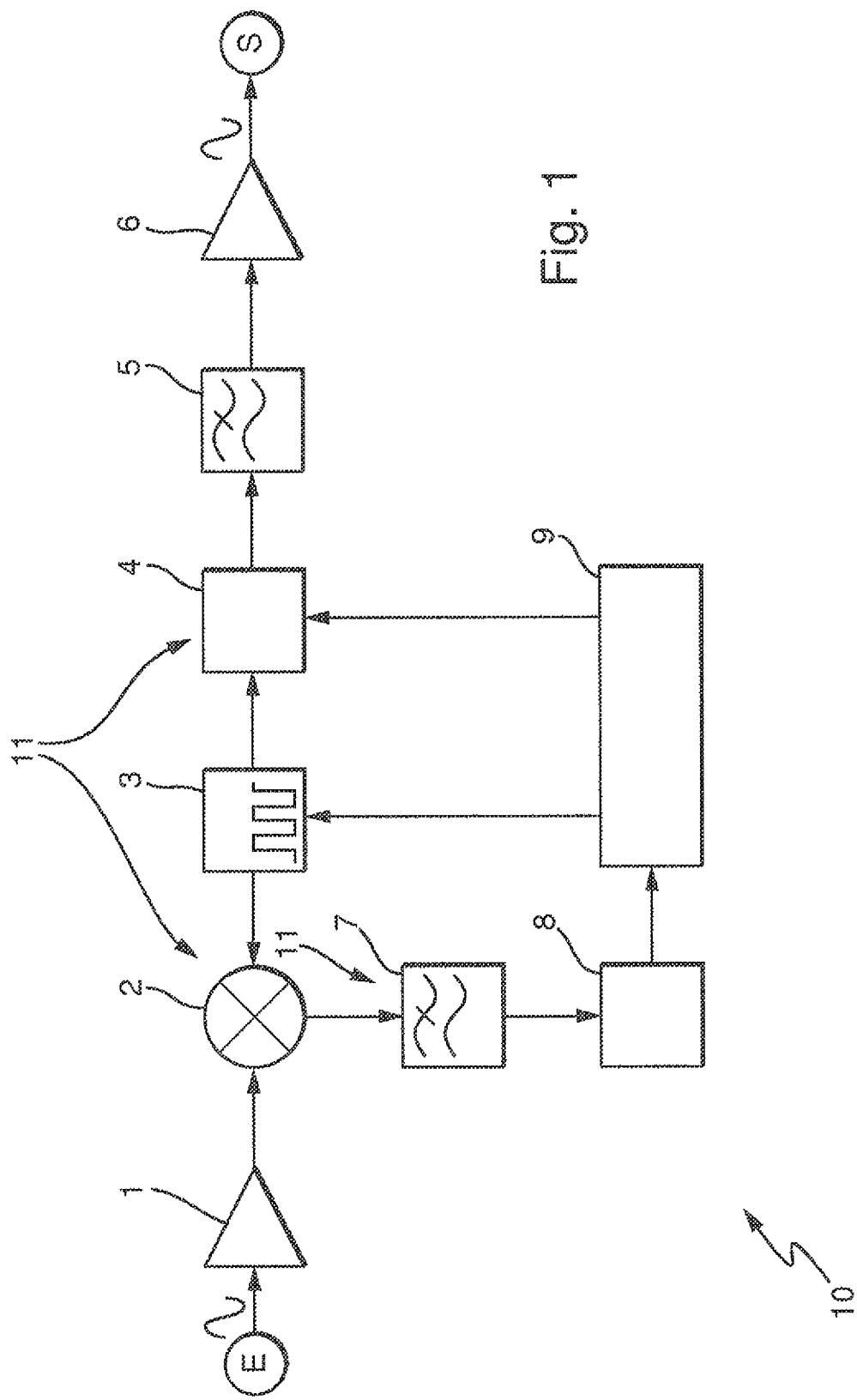
FIG. 1 is a block diagram of a first embodiment of the apparatus of the invention.

FIG. 1 shows a block diagram of a first embodiment of the apparatus of the invention. The received signal E of the oscillatable unit (not shown) is fed to the input of the amplifier 1. Amplifier 1 serves to match the impedance and amplitude between the receiving unit E, usually at least one piezoelectric element, of the oscillatable unit and the control/evaluation unit 10. A multiplier 2, which multiplies the signal of the receiving unit E with the periodic signal, here a rectangular signal, of the digital frequency generator 3, is connected after the amplifier 1. The output signal of the multiplier 2 shows the phase difference or the phase shift between the output signal of the amplifier 1 and the output signal of the frequency generator 3 as a direct voltage fraction. This direct voltage fraction is filtered out by the low-pass 7. Multiplier 2 and low-pass 7, together with the phase shifter 4, form the phase selective rectifier 11.

The digital frequency generator 3 produces the reference rectangular signal for the forced excitation of the oscillatable unit. The variable phase shifter 4 sets the phase difference between the signal of the receiving unit E and the signal of the transmitting unit S such that a certain level results with the multiplication of the two signals for the direct voltage fraction. The phase difference can be set to any desired value.

The low-pass 5 converts the rectangular signal of the frequency generator 3 into a sine like signal. A so called harmonic suppression is performed here. The amplifier 6 serves, in turn, to match the impedance and amplitude of the signal of the transmitting unit S.

The microcontroller 9 serves to control the sweep method for ascertaining the current resonance frequency. Furthermore, it communicates with a superordinated control unit, which is not illustrated in FIG. 1.

Figure 2:
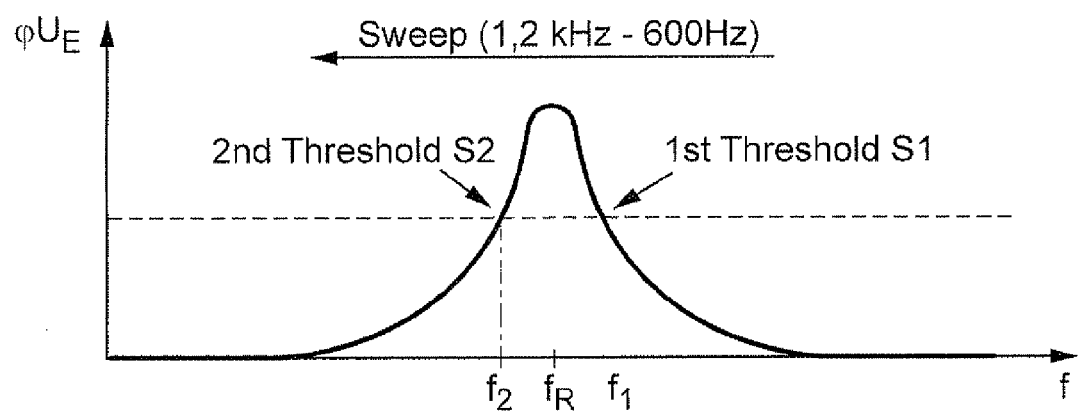
FIG. 2 is a schematic representation of the curve of the phase proportional direct voltage of a phase selective rectifier as a function of frequency.

According to the invention, a frequency scanning operation, a so called sweep, occurs in order to find the current resonance frequency of the oscillatable unit. The frequency of the signal produced by the digital frequency generator 3 is tuned via software of the microcontroller 9. Thus, there results the curve of the phase selective direct voltage shown in FIG. 2.

The comparator 8 compares the phase selective or phase proportional direct voltage with a predetermined threshold value S. When the first threshold value S1 is reached, the sweep is paused, and the frequency f1 is stored in a memory element associated with the microcontroller 9. Thereafter the sweep is continued until the second threshold value S2 is reached. The frequency f2 belonging to the second threshold value S2 is likewise stored. Then the arithmetic average is calculated from the two frequency values S1, S2. Preferably, the sweep is carried out from higher to lower frequencies.

The ascertained frequency, which corresponds to the current resonance frequency $f_R$ of the oscillatable unit, is tuned in; the oscillatable unit is excited to oscillations with the ascertained current resonance frequency $f_R$. As soon as the resonance frequency of the oscillatable unit changes, the next sweep is performed.

The oscillatable unit can be embodied in a number of very different ways, as already mentioned in the introduction of the description. The solution of the invention is especially distinguished in that it is possible, for the first time, to equip different oscillatory systems with an, at least almost, uniform, identical electronics. The apparatus of the invention or the method of the invention deliver a universal platform for the most varied of oscillatory systems, as used in the fields of fill level measurement, phase boundary level measurement or density measurement.

Figure 3:
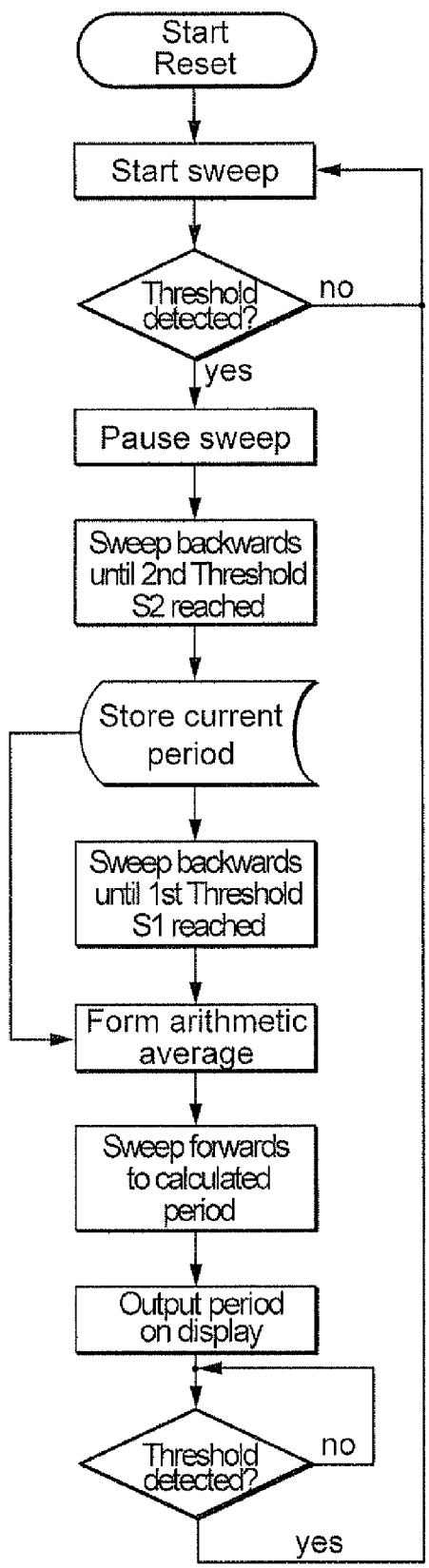
FIG. 3 is a flow diagram for visualizing the method of the invention relative to the forms of embodiment shown in FIG. 1 and FIG. 2.

A flow diagram, which sets forth the individual steps of the method of the invention, is shown in FIG. 3. Since the flow diagram is self explanatory, a repetition is omitted here.

Figure 4:
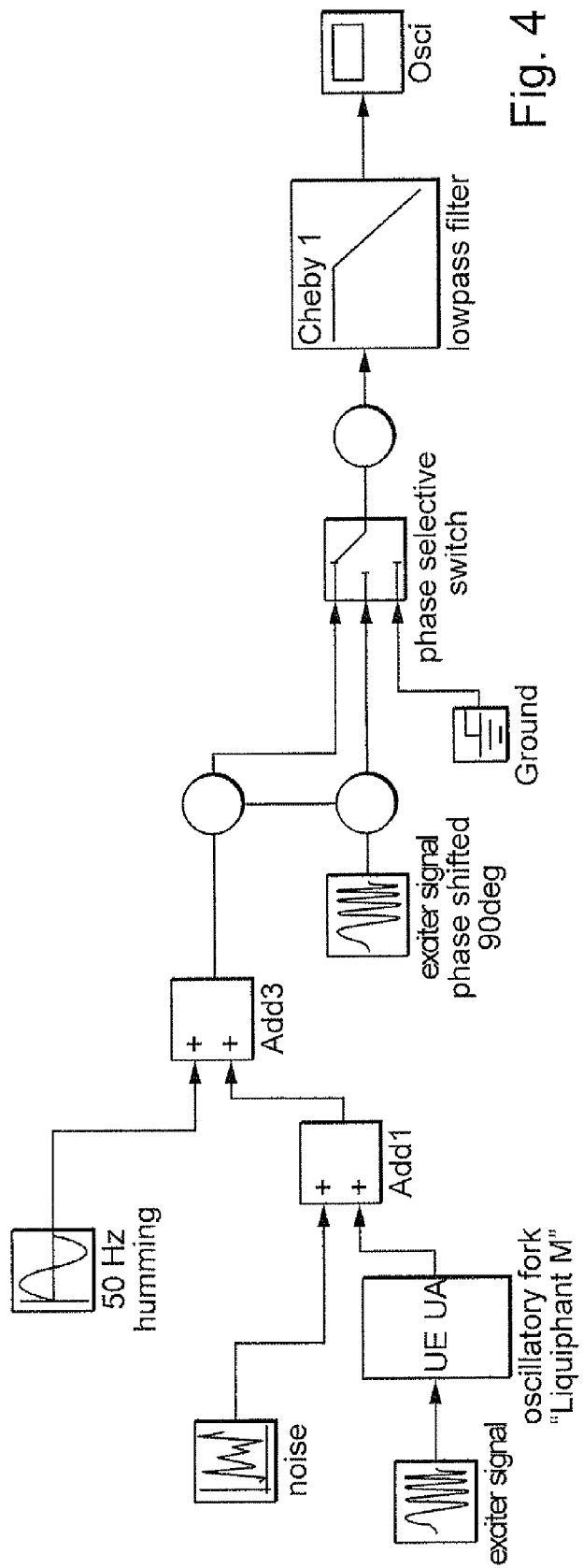
FIG. 4 is a block diagram for the purpose of implementing a phase selective rectification.
Figure 4A:
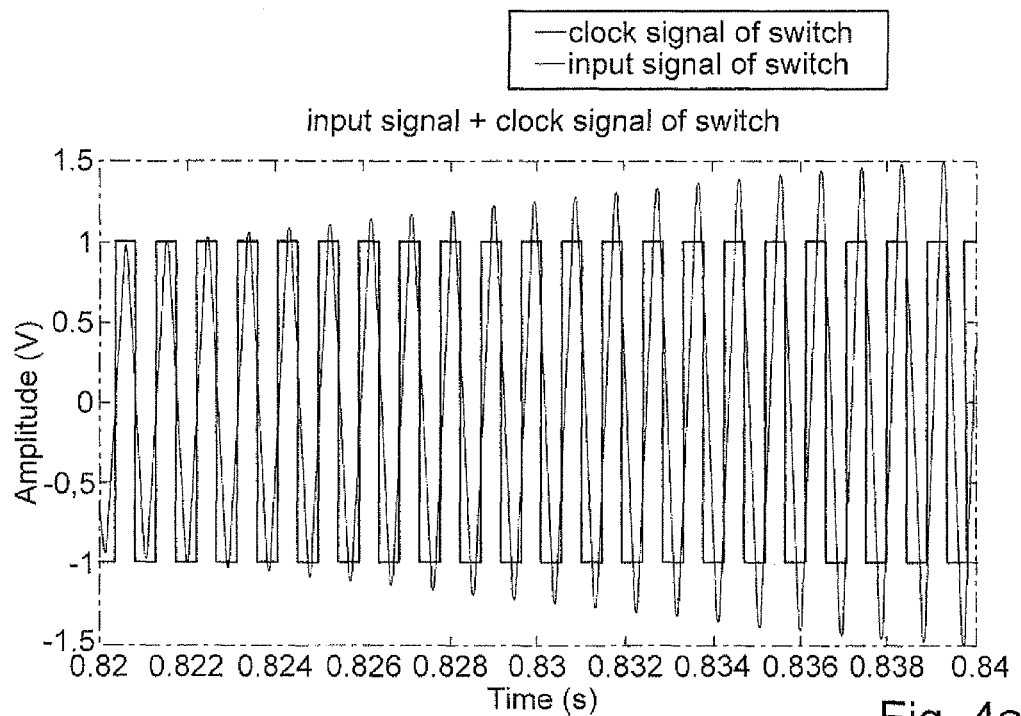
FIG. 4a is a diagram, which shows the dependence of the amplitudes of the input signal and a rectangular signal as a function of time.
Figure 4B:
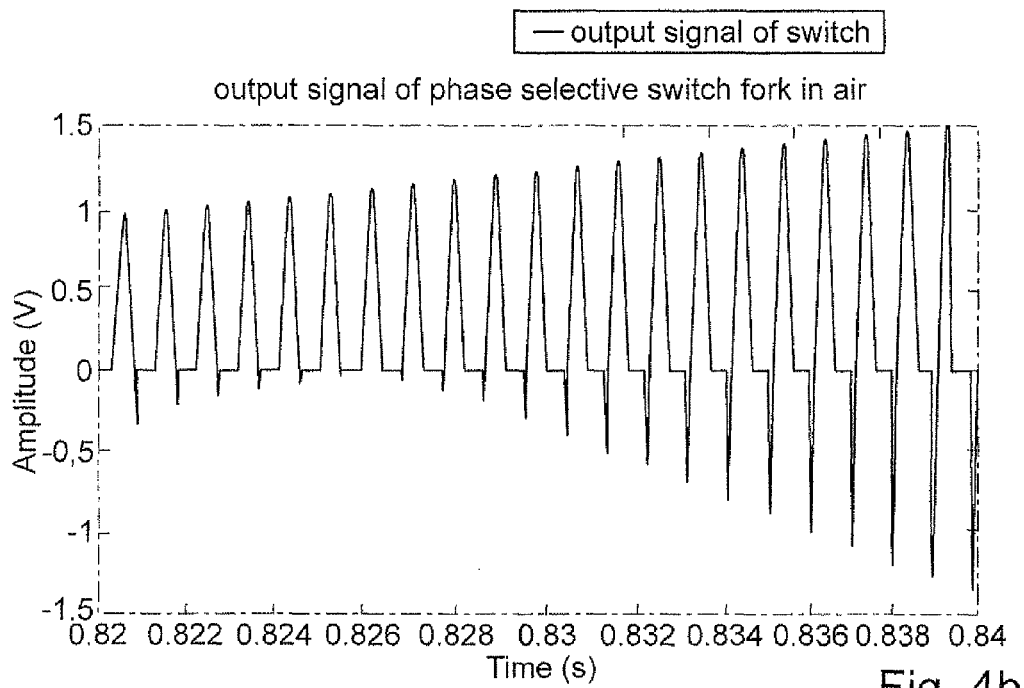
FIG. 4b is a diagram, which shows the dependence of the amplitudes of the output signal of the phase selective switch/rectifier as a function of time, and for the case when the oscillatable unit oscillates undamped in air.

FIG. 4 shows a block diagram of the phase selective rectification in the case of a mechanically undamped oscillatory system. The exciter signal, with which the oscillatable unit is excited to oscillate, is transmitted by the transmitting/receiving unit S/E to the membrane and the oscillatable unit secured to it. Disturbance signals, such as noise and grid humming, are superimposed on the output signal of the transmitting/receiving unit S/E at 50 Hz. This output signal superimposed with disturbance signals, together with the 90° phase shifted exciter signal, is fed to the phase selective switch. Since the phase shift of the eigenfrequency in the undamped case is 90°, it is to be expected that the phase selective rectified signal in the case of resonance, thus comprises positive half waves only and also has the maximum amplitude at this point in time. The corresponding diagrams are presented in FIG. 4a and FIG. 4b.

As a function of the sweep time, thus the time period in which a sweep over the working range of the oscillatable unit from the lowest to the highest frequency is performed, the resonance frequency, at which the maximum amplitude occurs, shifts. Moreover, the eigenfrequency shifts as a result of the delayed 'storage time' of the mechanical oscillatory system. The resonance frequency is defined as the frequency of the output signal at the point in time of maximum amplitude; the eigenfrequency is defined as the frequency at a phase rotation of 90° between the transmitting and the received signal. There is a shift of the resonance frequency and eigenfrequency caused by the forced excitation of the oscillatable unit.

Figure 5A:
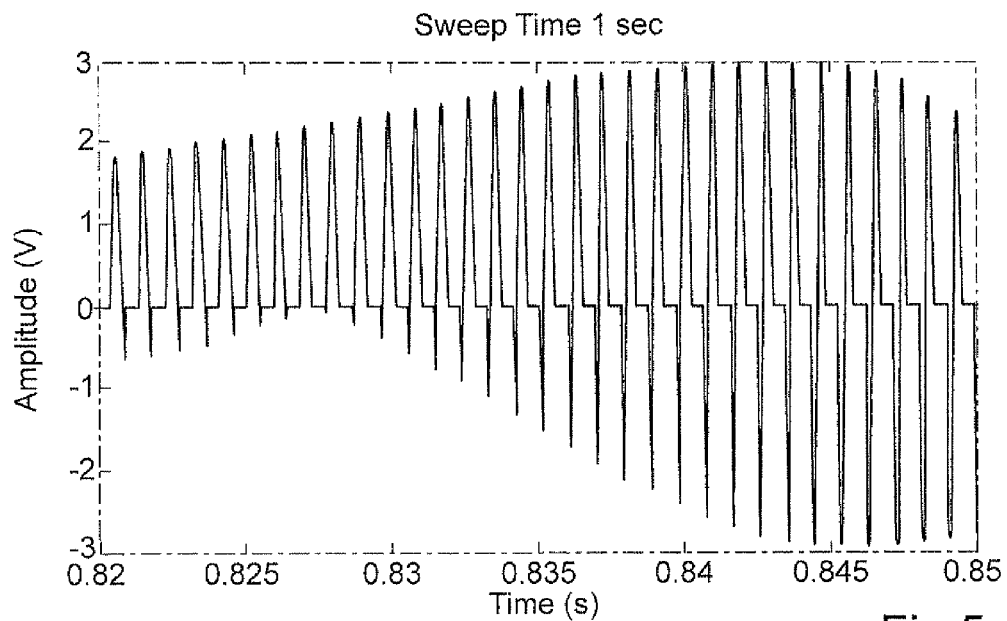
FIG. 5a is a representation of the amplitudes of the output signal of the phase selective rectifier for the case when the oscillatable unit oscillates undamped in air, where the sweep time is 1 sec and the phase selective rectifier is set to a 90° detection.
Figure 5B:
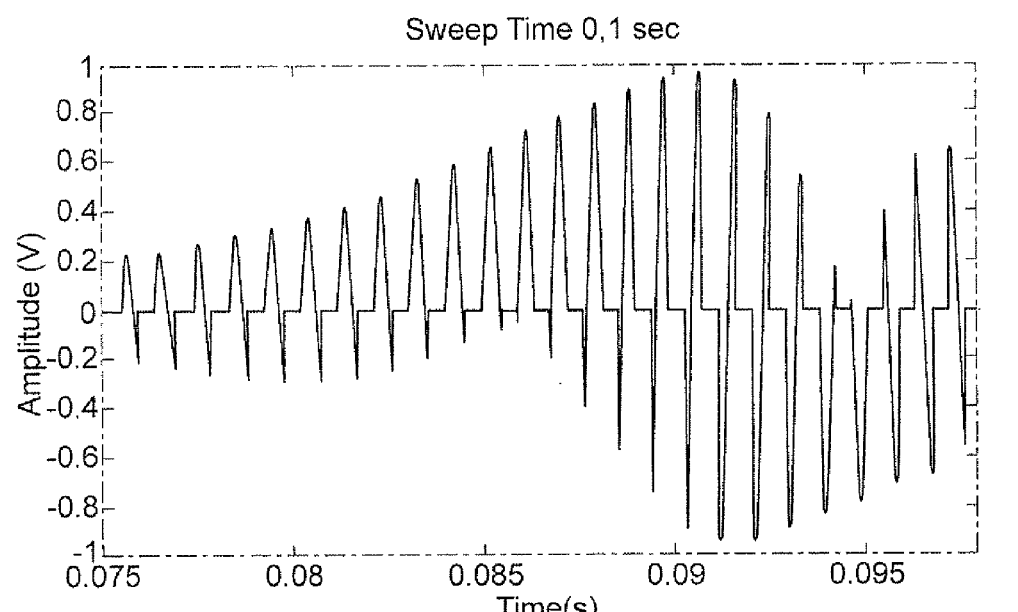
FIG. 5b is a representation of the amplitudes of the output signal of the phase selective rectifier for the case when the oscillatable unit oscillates undamped in air, where the sweep time is 0.1 sec and the phase selective rectifier is set to a 90° detection.

As a result of these shifts, the positive part of the phase selective signal has its maximum at another point in time than when the negative part of the signal has its zero crossing. This aspect is shown in FIG. 5a and FIG. 5b, which show the behavior of the phase selective signal in the case of two different sweep velocities of 1 sec and of 0.1 sec. Determining the resonance frequency with the assistance of the comparator is thereby supplementally made difficult in that the amplitude of the phase selective direct voltage, in addition to the dependence on the sweep time, also has a strong dependence on the damping of the medium, with which the oscillatable unit comes in contact.

As a result of the phase shift and the amplitude variation, an exact evaluation by means of a low-pass and comparator is made difficult. Consequently the solution shown in FIG. 1-FIG. 3 has its limits, especially in the case of high sweep velocities.

Figure 6:
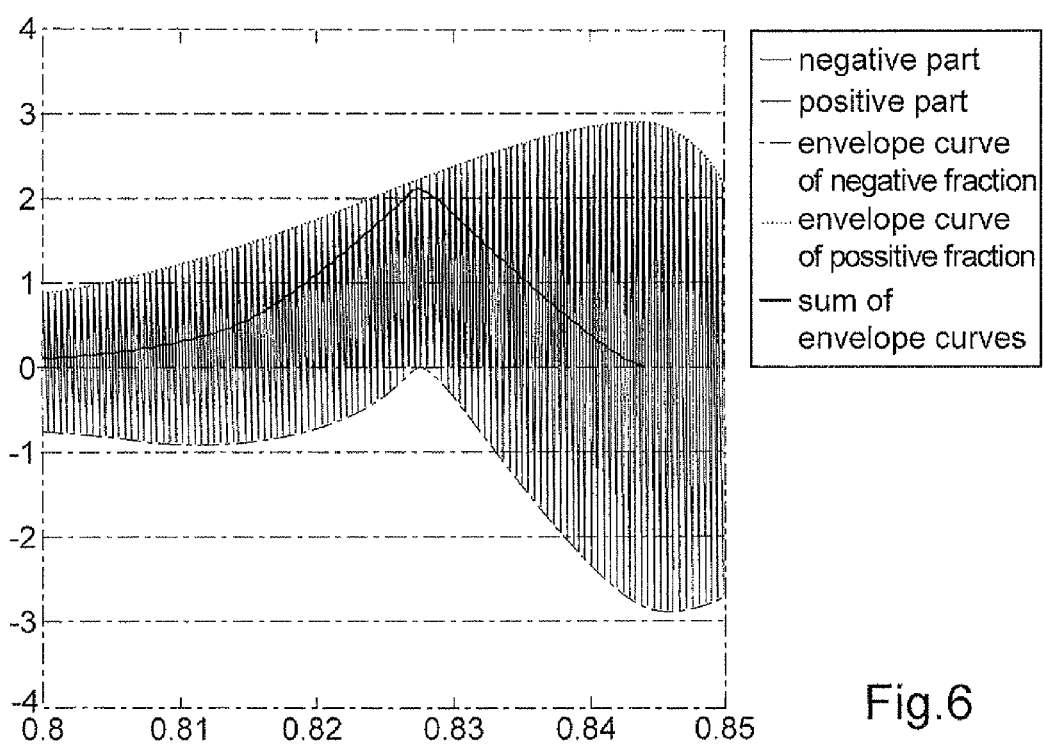
FIG. 6 is a schematic diagram of the method of the invention according to a second embodiment.

In order to also be able to apply the method of the invention in the case of high sweep times, an alternative solution is shown in FIG. 6. The phase selective rectified signal is separated into its positive and its negative signal components. Then, the two signal components are added. Since the maxima of the positive signal fraction and the negative signal fraction are shifted relative to one another, the envelope curves of the two signal components are first determined and then summed, i.e. in effect, a difference is calculated. Analog or digital envelope curve detectors determine the envelope curves. The resulting addition/difference signal has its maximum at the respectively set, predetermined phase shift between the transmitting and the received signals. Preferably, the phase shift is 90°.

The invention claimed is:

1. A method for determining or monitoring a predetermined fill level, a phase boundary or a density of a medium in a container with an oscillatable unit, comprising the steps of:
    placing the oscillatable unit at the height of the predetermined fill level;
    exciting the oscillatable unit to oscillate by means of a frequency scanning operation within a predeterminable frequency band in the working range of the oscillatable unit successively with discrete exciter frequencies following one another;
    receiving the corresponding oscillations of the oscillatable unit in the form of received signals;
    ascertaining the exciter frequency in the frequency scanning operation, at which the oscillatable unit oscillates with an oscillation frequency, which has a predetermined phase shift between the transmission signal and the received signal; and
    the transmitting/receiving unit excites the oscillatable unit to oscillate with the oscillation frequency ascertained or wherein a subsequent frequency scanning operation is started, wherein:
    the oscillation frequency at the predetermined phase shift between the transmission signal and the received signal is ascertained by evaluating amplitudes of the received signals received by the transmitting/receiving unit or by evaluating phase shift between the transmission signal and the received signal.

2. The method as claimed in claim 1, wherein:
    a new frequency scanning operation is started when the oscillatable unit oscillates outside the oscillation frequency at the predetermined phase shift between the transmission signal and the received signal.

3. The method as claimed in claim 1, wherein:
the evaluation of the phase shift between the transmission signal and the received signal is performed by a phase selective rectifier, which produces a direct voltage proportional to the phase and amplitude; and
the received signals of said phase selective rectifier are formed using the received signal of the transmitting/receiving unit and a signal derived from the transmitting unit.

4. The method as claimed in claim 3, wherein:
the oscillation frequency of the oscillatable unit at the predetermined phase shift between the transmission signal and the received signal is ascertained based on two frequencies, at which a predetermined threshold value of the amplitude of the received signals or the phase proportional direct voltage is reached or exceeded, lying essentially symmetrically to the oscillation frequency at the predetermined phase shift between the transmission signal and the received signal.

5. The method as claimed in claim 3, wherein:
a phase selective signal produced by said phase selective rectifier is divided into a positive signal portion and a negative signal portion;
the envelope curve of the positive signal fraction and the envelope curve of the negative signal fraction are formed; wherein the two envelope curves are added; and
the oscillation frequency of the oscillatable unit at the predetermined phase shift between the transmission signal and the received signal is ascertained based on the addition signal.

6. The method as claimed in claim 1, wherein:
the frequency range in the working range of the oscillatable unit is passed through during a frequency scanning operation.

7. An apparatus for determining or monitoring a predetermined fill level or a phase boundary of a medium in a container, comprising:
an oscillatable unit, wherein the oscillatable unit is placed at the height of the predetermined fill level;
a transmitting/receiving unit, which excites said oscillatable unit to oscillate successively with discrete exciter frequencies following one another in a frequency scanning operation within a predeterminable frequency band in the working range of said oscillatable unit and which receives the corresponding oscillations of said oscillatable unit; and
a control/evaluation unit, which ascertains the exciter frequency at which said oscillatable unit oscillates at an oscillation frequency with a predetermined phase shift between the transmission signal and the received signal, wherein:
said transmitting/receiving unit excites said oscillatable unit to oscillate at the predetermined phase shift between the transmission signal and the received signal with the ascertained oscillation frequency, wherein:
said control/evaluating unit is so embodied that it ascertains the oscillation frequency of the oscillatable unit at the predetermined phase shift between the transmission signal and the received signal by evaluating, during the frequency scanning operation, the phase between the transmission signal and the received signal or amplitude of the received signal.

8. The apparatus as claimed in claim 7, wherein:
said control/evaluation unit is provided with a phase selective rectifier, which produces a phase selective direct voltage,
said apparatus further comprising:
a first low-pass filter and a comparator connected after said phase selective rectifier; and
a microcontroller, which ascertains the oscillation frequency of said oscillatable unit at the predetermined phase shift between the transmission signal and the received signal based on two frequencies, which lie symmetrically to the resonance frequency and at which the predetermined threshold values of the amplitude of the received signals or the phase proportional direct voltage of said phase selective rectifier are reached or exceeded.

9. The apparatus as claimed in claim 8, wherein:
said phase selective rectifier comprises a multiplier, a producer unit to produce a reference signal, whose clock frequency is adjustable by a microcontroller, a phase shifter controllable by said microcontroller and a low-pass;
said multiplier multiplies the reference signal, which has, in each case, the clock frequency predetermined by said microcontroller, with the received signal;
said phase shifter adjusts the phase relationship of the reference signal and the received signal; and the phase proportional direct voltage is tappable at the output of said first low-pass, which is connected after said multiplier.

10. The apparatus as claimed in claim 9, wherein:
a comparator is connected after said first low-pass; said comparator serving as a threshold detector and its output signals are forwarded to said microcontroller;
said microcontroller ascertains the current oscillation frequency of said oscillatable unit at the predetermined phase shift between the transmission signal and the received signal based on an average of a first threshold value and a second threshold value ascertained during the frequency scanning operation.

11. The apparatus as claimed in claim 9, wherein:
a second low-pass is connected to said phase shifter; and a sinusoidal signal is present at its output; the transmitting/receiving unit excites said oscillatable unit to oscillate at the current oscillation frequency of said oscillatable unit at the predetermined phase shift between the transmission signal and the received signal with the sinusoidal signal.

12. The apparatus as claimed in claim 7, wherein:
said control/evaluation unit produces a phase selective rectified signal;
said control/evaluation unit divides the phase selective signal into a positive signal portion and a negative signal portion;
said control/evaluation unit determines and adds the envelope curve of the positive signal fraction and the envelope curve of the negative signal fraction; and
said control/evaluation unit ascertains the oscillation frequency of said oscillatable unit at the predetermined phase shift between the transmission signal and the received signal based on the addition signal.

13. The apparatus as claimed in claim 7, wherein:
said control/evaluation unit is embodied as a digital circuit.

14. The apparatus as claimed in claim 7, wherein:
the oscillation frequency of said oscillatable unit with predetermined phase is the oscillation frequency of the fundamental mode or the oscillation frequency of a higher mode at the predetermined phase shift.

\* \* \* \* \*